United States Patent
Jeong et al.

(10) Patent No.: US 9,834,825 B2
(45) Date of Patent: Dec. 5, 2017

(54) METHOD FOR COLLECTING SILVER IONS AND PHOSPHORIC ACID IN WASTE FLUID

(71) Applicant: SAMSUNG DISPLAY CO., LTD., Yongin, Gyeonggi-Do (KR)

(72) Inventors: Jihoon Jeong, Cheonan-si (KR); Donghyun Kim, Hwaseong-si (KR); Yeongil Kim, Seoul (KR); Seungmo Choi, Asan-si (KR); Jinki Noh, Seoul (KR); Jiho Park, Cheonan-si (KR); Jeongsik Yoo, Cheonan-si (KR); Young Il Lee, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 124 days.

(21) Appl. No.: 14/695,496

(22) Filed: Apr. 24, 2015

(65) Prior Publication Data

US 2016/0076120 A1   Mar. 17, 2016

(30) Foreign Application Priority Data

Sep. 12, 2014 (KR) ........................ 10-2014-0121128

(51) Int. Cl.
| | | |
|---|---|---|
| *C25C 1/00* | (2006.01) | |
| *C22B 3/00* | (2006.01) | |
| *C01B 25/234* | (2006.01) | |
| *C25C 1/20* | (2006.01) | |

(52) U.S. Cl.
CPC .......... *C22B 11/046* (2013.01); *C01B 25/234* (2013.01); *C25C 1/20* (2013.01); *Y02P 10/214* (2015.11); *Y02W 10/37* (2015.05)

(58) Field of Classification Search
CPC ..... C22B 11/046; C22B 7/006; C01B 25/234; C01B 25/238; C25C 1/20
USPC .... 75/427, 711, 720, 721, 733, 741; 423/42, 423/321.1; 205/571
See application file for complete search history.

(56) References Cited

FOREIGN PATENT DOCUMENTS

| GB | 1337669 | * | 11/1973 |
|---|---|---|---|
| JP | 2005-144374 A | | 6/2005 |
| JP | 2007-031748 A | | 2/2007 |
| KR | 10-2012-0131239 A | | 12/2004 |
| KR | 10-2007-0068205 A | | 6/2007 |
| KR | 10-2008-0075203 A | | 8/2008 |
| KR | 10-2009-0059435 A | | 6/2009 |
| WO | 2012-057242 | * | 5/2012 |

OTHER PUBLICATIONS

J.A. Murphy, A.H. Ackerman, and J.K. Heeren, "Recovery of silver from and some Uses for waste silver chloride" Journal of Chemical Education, Jul. 1, 1991, pp. 602-604.

* cited by examiner

Primary Examiner — Steven Bos
(74) Attorney, Agent, or Firm — Lee & Morse, P.C.

(57) ABSTRACT

A method for collecting silver ions and phosphoric acid in a waste fluid includes collecting silver chloride from the waste fluid, collecting silver chloride including providing a chloride compound to the waste fluid; and collecting phosphoric acid, collecting phosphoric acid including distilling the waste fluid from which the silver chloride has been collected.

20 Claims, 1 Drawing Sheet

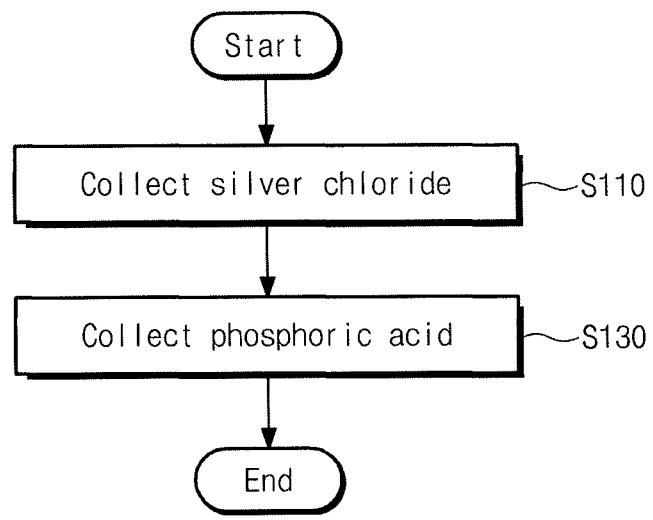
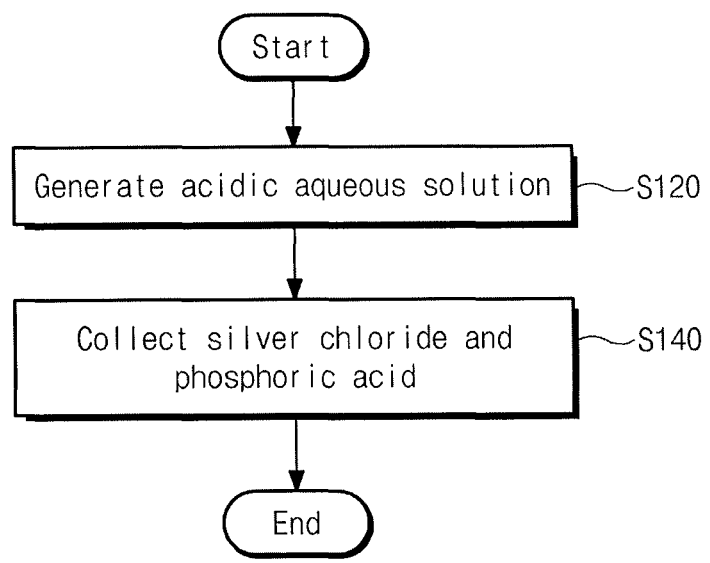

METHOD FOR COLLECTING SILVER IONS AND PHOSPHORIC ACID IN WASTE FLUID

CROSS-REFERENCE TO RELATED APPLICATION

Korean Patent Application No. 10-2014-0121128, filed on Sep. 12, 2014, in the Korean Intellectual Property Office, and entitled: "Method for Collecting Silver Ions and Phosphoric Acid in Waste Fluid," is incorporated by reference herein in its entirety.

BACKGROUND

1. Field

The present disclosure herein relates to a method for collecting silver ions and phosphoric acid in a waste fluid.

2. Description of the Related Art

Waste fluids generated while electronic components such as, for example, display devices, semiconductor devices, solar cells, and printed circuit boards (PCBs), are manufactured may contain silver ions and phosphoric acid. As production of display devices increases, the amount of waste fluids generated during manufacture of display devices increases.

SUMMARY

Embodiments may be realized by providing a method for collecting silver ions and phosphoric acid in a waste fluid, the method including collecting silver chloride from the waste fluid, collecting silver chloride including providing a chloride compound to the waste fluid; and collecting phosphoric acid, collecting phosphoric acid including distilling the waste fluid from which the silver chloride has been collected.

The chloride compound may include one or more of HCl, NaCl, $CaCl_2$, or KCl.

Collecting silver chloride may include generating a mixed waste fluid, generating the mixed waste fluid including providing the chloride compound to the waste fluid; and separating the silver chloride from the mixed waste fluid.

Separating the silver chloride may include one or more of centrifugation, vacuum filtration, pressure filtration, or gravity filtration.

Generating the mixed waste fluid may be performed at a temperature of about 25° C. to about 80° C.

Generating the mixed waste fluid may be performed for about 10 minutes to about 120 minutes.

The waste fluid may include silver ions, and a molar ratio between the chloride compound and the silver ions may be about 1:2 to about 1:3.

The method may further include obtaining silver metal from the collected silver chloride.

Obtaining silver metal may include one or more of electrolysis, pyrolysis, or chemical treatment.

The chloride compound may be an aqueous solution or a solid powder.

Collecting phosphoric acid may be performed at a temperature of about 80° C. to about 150° C.

Collecting phosphoric acid may be performed under a pressure of about 1 mmHg to about 760 mmHg.

Embodiments may be realized by providing method for collecting silver ions and phosphoric acid in a waste fluid, the method including generating an acidic aqueous solution, generating the acidic aqueous solution including distilling the waste fluid; and collecting silver chloride and phosphoric acid, collecting silver chloride and phosphoric acid including providing a chloride compound to the acidic aqueous solution.

Collecting silver chloride and phosphoric acid may include collecting precipitated silver chloride, collecting precipitated silver chloride including filtering the acidic aqueous solution to provide a filtered acidic aqueous solution; and collecting the phosphoric acid from the filtered acidic aqueous solution.

Generating the acidic aqueous solution may be performed at a temperature of about 80° C. to about 150° C.

Generating the acidic aqueous solution may be performed under a pressure of about 1 mmHg to about 760 mmHg.

The chloride compound may include one or more of HCl, NaCl, $CaCl_2$, or KCl.

The chloride compound may be an aqueous solution or a solid powder.

Collecting silver chloride and phosphoric acid may be performed at a temperature of about 25° C. to about 80° C.

Collecting silver chloride and phosphoric acid may be performed for about 10 minutes to about 120 minutes.

BRIEF DESCRIPTION OF THE DRAWINGS

Features will become apparent to those of skill in the art by describing in detail exemplary embodiments with reference to the attached drawings in which:

FIG. 1 illustrates a schematic flowchart of a method for collecting silver ions and phosphoric acid in a waste fluid according to an embodiment; and FIG. 2 illustrates a schematic flowchart of a method for collecting silver ions and phosphoric acid in a waste fluid according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It should be further understood that the term "comprise", "comprising,", "include", "including", "have" or "having", when used herein, specifies the presence of stated features, numbers, steps, operations, elements, components or combinations thereof, but does not preclude the presence or addition of one or more other features, numbers, steps, operations, elements, components or combinations thereof.

Hereinafter, a method for collecting silver ions and phosphoric acid in a waste fluid according to an embodiment will be described.

FIG. 1 illustrates a schematic flowchart of a method for collecting silver ions and phosphoric acid in a waste fluid according to an embodiment. Referring to FIG. 1, the method for collecting silver ions and phosphoric acid in a waste fluid according to an embodiment may include providing a chloride compound to a waste fluid to collect silver chloride (S110) and distilling the waste fluid from which the silver chloride has been collected to collect phosphoric acid (S130).

The waste fluid may include silver ions and phosphoric acid. The waste fluid may be, for example, an acidic waste fluid generated during an etching process for manufacturing an electronic product such as, for example, a display device, a semiconductor device, or a printed circuit board. The waste fluid may include not only silver ions and phosphoric acid but also other additives such as nitric acid ions and acetic acid ions and derivatives thereof. For example, the waste fluid may include about 50 parts by weight to about 70 parts by weight of phosphoric acid, about 5 parts by weight to about 30 parts by weight of acetic acid, about 3 parts by weight to about 10 parts by weight of nitric acid and about 0.03 parts by weight to about 1.0 parts by weight of silver ions. The waste fluid may further include other additives such as a surfactant.

The chloride compound may include, for example, one or more of HCl, NaCl, $CaCl_2$, or KCl. The chloride compound may be an aqueous solution or a solid powder. The chloride compound may be mixed with the waste fluid in the form of powder, or may be dissolved in a solvent such as water in order to be mixed with the waste fluid.

The waste fluid may include silver ions, and a molar ratio between the chloride compound and the silver ions may be about 1:2 to about 1:3. If the molar ratio between the chloride compound and the silver ions is less than about 1:2, the amount of the chloride compound may be larger than that of the silver ions, the precipitation amount of silver chloride may not be further increased, and inefficiency may be caused. If the molar ratio between the chloride compound and the silver ions is greater than about 1:3, the amount of the chloride compound may be smaller than that of the silver ions, and silver chloride may not be sufficiently generated.

Collecting silver chloride (S110) may include providing the chloride compound to the waste fluid to form a mixed fluid waste and filtering the mixed waste fluid to separate the silver chloride.

The chloride compound may be provided to the waste fluid, agitation may be performed, and reaction rate and reaction efficiency may be increased. Agitation may allow rapid dissolution of the chloride compound in the waste fluid. Agitation and providing the chloride compound may be simultaneously performed. In an embodiment, agitation may be started before providing the chloride compound, or may be performed after providing the chloride compound.

Forming the mixed fluid waste may be performed at a temperature of about 25° C. to about 80° C. If forming the mixed fluid waste is performed at a temperature of less than about 25° C., the silver chloride may not be sufficiently generated, for example, due to low temperature. If forming the mixed fluid waste is performed at a temperature of higher than about 80° C., the generation amount of the silver chloride may not be increased, and energy efficiency may be decreased.

Forming the mixed fluid waste may be performed for about 10 minutes to about 120 minutes. If forming the mixed fluid waste is performed for less than about 10 minutes, the silver chloride may not be sufficiently generated. If forming the mixed fluid waste is performed for more than about 120 minutes, the generation amount of the silver chloride may not be increased, and energy efficiency may be decreased.

The silver chloride may not be dissolved but may be precipitated in the mixed waste fluid. The silver ions may react with chloride ions contained in the chloride compound, and the silver chloride may be formed. The silver chloride may be larger than the silver ions and may be present in the form of a precipitate, and the silver chloride may be separated and may prevent clogging of filter media caused by, for example, microparticles.

In an embodiment, separating the silver chloride may include one or more of centrifugation, vacuum filtration, pressure filtration, or gravity filtration.

The method for collecting silver ions and phosphoric acid in a waste fluid according to an embodiment may further include obtaining silver metal from the collected silver chloride.

In an embodiment, obtaining silver metal may include one or more of electrolysis, pyrolysis, or chemical treatment.

Collecting phosphoric acid (S130) may be performed by distilling the waste fluid from which the silver chloride has been collected. During collecting phosphoric acid (S130) the waste fluid from which the silver chloride has been collected may be distilled, volatile impurities from the waste fluid may be removed, and the phosphoric acid may be collected.

In an embodiment, collecting phosphoric acid (S130) may be performed through distillation under reduced pressure. Collecting phosphoric acid (S130) may be performed in a vacuum concentrator under reduced pressure, and low-boiling-point impurities such as acetic acid and nitric acid may be removed and phosphoric acid having a high purity level of about 75% to about 85% (weight percent) may be collected.

Collecting phosphoric acid (S130) may be performed at a temperature of about 80° C. to about 150° C. If collecting phosphoric acid is performed at a temperature of less than about 80° C., volatile impurities may not be sufficiently removed. If collecting phosphoric acid is performed at a temperature of more than about 150° C., the phosphoric acid may be vaporized, the rate of collecting the phosphoric acid may not be further increased, and energy efficiency may be decreased.

Collecting phosphoric acid (S130) may be performed at a pressure of about 1 mmHg to about 760 mmHg. If collecting phosphoric acid is performed at a pressure of less than about 1 mmHg, volatile impurities may not be sufficiently removed, for example, due to insufficient pressure. If collecting phosphoric acid is performed at a pressure of more than about 760 mmHg, the phosphoric acid may be vaporized, the rate of collecting the phosphoric acid may not be further increased, and energy efficiency may be decreased.

Collected phosphoric acid may be reused in electronic industry, or may be reused for various purposes such as metal surface treatment, manufacture of various phosphates and condensed phosphates, softening agents, agricultural chemicals and fertilizers, and plating.

Hereinafter, a method for collecting silver ions and phosphoric acid in a waste fluid according to an embodiment will be described with reference to FIG. 2. Hereinafter, the method for collecting silver ions and phosphoric acid in a waste fluid according to an embodiment will be described with a focus on differences between the method illustrated in FIG. 1 and the method illustrated in FIG. 2.

FIG. 2 illustrates a schematic flowchart of a method for collecting silver ions and phosphoric acid in a waste fluid according to an embodiment. Referring to FIG. 2, the method for collecting silver ions and phosphoric acid in a waste fluid according to an embodiment may include distilling a waste fluid to generate an acidic aqueous solution (S120) and providing a chloride compound to the acidic aqueous solution to collect silver chloride and phosphoric acid (S140).

The waste fluid may include silver ions and phosphoric acid. The waste fluid may be, for example, an acidic waste fluid generated during an etching process for manufacturing an electronic product such as, for example, a display device, a semiconductor device, or a printed circuit board. The waste fluid may include not only silver ions and phosphoric acid but also other additives such as nitric acid ions and acetic acid ions and derivatives thereof. For example, the waste fluid may include about 50 parts by weight to about 70 parts by weight of phosphoric acid, about 5 parts by weight to about 30 parts by weight of acetic acid, about 3 parts by weight to about 10 parts by weight of nitric acid and about 0.03 parts by weight to about 1.0 parts by weight of silver ions. The waste fluid may further include other additives such as a surfactant.

In an embodiment, generating acidic aqueous solution (S120) may be performed through distillation under reduced pressure. Generating acidic aqueous solution (S120) may be performed in a vacuum concentrator under reduced pressure, and low-boiling-point impurities such as acetic acid and nitric acid may be removed and an acidic aqueous solution containing phosphoric acid having a high purity level of about 75% to about 85% (weight percent) and silver ions may be collected.

Generating acidic aqueous solution (S120) may be performed at a temperature of about 80° C. to about 150° C. If generating acidic aqueous solution is performed at a temperature of less than about 80° C., volatile impurities may not be sufficiently removed. If generating acidic aqueous solution is performed at a temperature of more than about 150° C., the phosphoric acid may be vaporized, the rate of collecting the acidic aqueous solution may not be further increased, and energy efficiency may be decreased.

Generating acidic aqueous solution (S120) may be performed at a pressure of about 1 mmHg to about 760 mmHg. If generating acidic aqueous solution is performed at a pressure of less than about 1 mmHg, volatile impurities may not be sufficiently removed, for example, due to insufficient pressure. If generating acidic aqueous solution is performed at a pressure of more than about 760 mmHg, the phosphoric acid may be vaporized, the rate of collecting the acidic aqueous solution may not be further increased, and energy efficiency may be decreased.

The chloride compound may include, for example, one or more of HCl, NaCl, $CaCl_2$, or KCl. The chloride compound may be an aqueous solution or a solid powder. The chloride compound may be mixed with the waste fluid in the form of powder, or may be dissolved in a solvent such as water in order to be mixed with the waste fluid.

The waste fluid may include silver ions, and a molar ratio between the chloride compound and the silver ions may be about 1:2 to about 1:3. If the molar ratio between the chloride compound and the silver ions is less than about 1:2, the amount of the chloride compound may be larger than that of the silver ions, the precipitation amount of silver chloride may not be further increased, and inefficiency may be caused. If the molar ratio between the chloride compound and the silver ions is greater than about 1:3, the amount of the chloride compound may be smaller than that of the silver ions, and silver chloride may not be sufficiently generated.

Collecting silver chloride and phosphoric acid (S140) may be performed by filtering the acidic aqueous solution, and precipitated silver chloride may be collected and phosphoric acid may be collected from the filtered acidic aqueous solution.

In an embodiment, collecting silver chloride and phosphoric acid (S140) may include one or more of centrifugation, vacuum filtration, pressure filtration, or gravity filtration.

Collecting silver chloride and phosphoric acid (S140) may be performed at a temperature of about 25° C. to about 80° C. If collecting silver chloride and phosphoric acid (S140) is performed at a temperature of less than about 25° C., the silver chloride may not be sufficiently generated, for example, due to a low temperature. If collecting silver chloride and phosphoric acid (S140) is performed at a temperature of higher than about 80° C., the generation amount of the silver chloride may not be increased, and energy efficiency may be decreased.

Collecting silver chloride and phosphoric acid (S140) may be performed for about 10 minutes to about 120 minutes. If collecting silver chloride and phosphoric acid (S140) is performed for less than about 10 minutes, the silver chloride may not be sufficiently generated. If collecting silver chloride and phosphoric acid (S140) is performed for more than about 120 minutes, the generation amount of the silver chloride may not be increased, and energy efficiency may be decreased.

The silver chloride may not be dissolved but may be precipitated in the acidic aqueous solution. The silver ions may react with chloride ions contained in the chloride compound, and the silver chloride may be formed. The silver chloride may be larger than the silver ions and may be present in the form of a precipitate, and the silver chloride may be separated and may prevent clogging of filter media caused by, for example, microparticles.

The method for collecting silver ions and phosphoric acid in a waste fluid according to an embodiment may further include obtaining silver metal from the collected silver chloride.

In an embodiment, obtaining silver metal may include one or more of electrolysis, pyrolysis, or chemical treatment.

Collected phosphoric acid may be reused in electronic industry, or may be reused for various purposes such as metal surface treatment, manufacture of various phosphates and condensed phosphates, softening agents, agricultural chemicals and fertilizers, and plating.

The following Examples are provided in order to highlight characteristics of one or more embodiments, but it will be understood that the Examples are not to be construed as limiting the scope of the embodiments. Further, it will be understood that the embodiments are not limited to the particular details described in the Examples.

Example 1a

About 1000 g of a waste fluid containing about 65 parts by weight of phosphoric acid, about 10 parts by weight of nitric acid, about 5 parts by weight of acetic acid and about 0.15 parts by weight of silver collected during a manufacturing process of a display device was prepared in a 2 L three-necked flask equipped with a mechanical agitator and a thermometer. Hydrochloric acid having a concentration of about 35% (weight percent) was added to the waste fluid at a room temperature, while agitating the waste fluid for about 60 minutes without heating or cooling the waste fluid, so as to generate a mixed waste fluid in which silver chloride was precipitated. The mixed waste fluid was poured onto filter paper having a diameter of about 20 mm and containing about 0.02 mg of ash, the filter paper was placed on a Buchner funnel having a diameter of about 22 cm, and a precipitate and a filtrate were solid-liquid separated through vacuum suction filtration using an aspirator so as to separate about 0.56 g of silver chloride.

A result of measuring an amount of silver ions remaining in the filtrate after separating the silver chloride is shown in Table 1 below.

Thereafter, the filtrate was moved to a rotary vacuum evaporator. Then, the filtrate was vacuum-distilled until the volume of the filtrate became about 65% of its original volume, while rotating a flask of the vacuum evaporator at a rate of about 60 rpm at a temperature of about 100° C. and under a condition of reduced pressure of about 130 mmHg, so as to collect about 600 g of phosphoric acid having a concentration of about 85% (weight percent) by removing volatile impurities and cooling the filtrate.

The concentration of the phosphoric acid collected through the present example was measured using an ion chromatography analyzer (ICS-2500, DIONEX), and a silver (Ag) component in the acidic waste fluid was measured using inductively coupled plasma atomic emission spectrometry (ICP-AES).

Example 1b

Example 1b was performed in the same manner as Example 1a, except that the molar ratio between hydrochloric acid and silver ions in the waste fluid was different. A result of measuring an amount of silver ions remaining in the filtrate after separating the silver chloride is shown in Table 1 below.

TABLE 1

| Experiment No. | Silver (Ag) content in waste fluid (g) | 35 wt % hydrochloric acid (g) | Molar ratio between hydrochloric acid and silver ions in waste fluid | Silver (Ag) ion content in filtrate (ppm) |
|---|---|---|---|---|
| Example 1a-1 | 1.5 | 2.90 | 1:2.0 | 38 |
| Example 1a-2 | 1.5 | 3.62 | 1:2.5 | 35 |
| Example 1a-3 | 1.5 | 4.35 | 1:3.0 | 35 |
| Example 1b-1 | 1.5 | 1.45 | 1:1.0 | 200 |
| Example 1b-2 | 1.5 | 2.17 | 1:1.5 | 80 |

Referring to Table 1, when the molar ratio between the hydrochloric acid and the silver ions in the waste fluid is about 1:2.0 to about 1:3, the silver component may be removed through the precipitation of the silver chloride by simply adding the hydrochloric acid to the waste fluid and agitating.

Example 2a

Example 2a was performed in the same manner as Example 1a, except that sodium chloride powder (reagent grade: more than about 99.0% (weight percent)) was added instead of 35 wt % hydrochloric acid. In Example 2a, about 0.54 g of silver chloride was separated.

A result of measuring an amount of silver ions remaining in the filtrate after separating the silver chloride is shown in Table 2 below.

Example 2b

Example 2b was performed in the same manner as Example 2a, except that the molar ratio between sodium chloride and silver ions in the waste fluid was different. A result of measuring an amount of silver ions remaining in the filtrate after separating the silver chloride is shown in Table 2 below.

TABLE 2

| Experiment No. | Silver (Ag) content in waste fluid (g) | Sodium chloride (g) | Molar ratio between sodium chloride and silver ions in waste fluid | Silver (Ag) ion content in filtrate (ppm) |
|---|---|---|---|---|
| Example 2a-1 | 1.5 | 1.63 | 1:2.0 | 43 |
| Example 2a-2 | 1.5 | 2.03 | 1:2.5 | 40 |
| Example 2a-3 | 1.5 | 2.44 | 1:3.0 | 30 |
| Example 2b-1 | 1.5 | 0.81 | 1:1.0 | 300 |
| Example 2b-2 | 1.5 | 1.22 | 1:1.5 | 100 |

Referring to Table 2, when the molar ratio between the sodium chloride and the silver ions in the waste fluid is about 1:2.0 to about 1:3, the silver component may be removed through the precipitation of the silver chloride by simply adding the sodium chloride to the waste fluid and agitating. If the molar ratio between the hydrochloric acid and the silver ions in the waste fluid is larger than about 1:3, the amount of collected silver may be increased, but the amount of sodium phosphate in the collected phosphoric acid may be increased, and the quality of the phosphoric acid may be degraded.

Example 3

About 1000 g of a waste fluid containing about 65 parts by weight of phosphoric acid, about 10 parts by weight of nitric acid, about 5 parts by weight of acetic acid and about 0.15 parts by weight of silver collected from a semiconductor manufacturing plant was put into a 2 L three-necked flask equipped with a mechanical agitator, a thermometer and a reflux condenser, and hydrochloric acid having a of about 35% (weight percent) was added to the waste fluid, while agitating the waste fluid for about 60 minutes and maintaining the temperature shown in Table 3 by using a heating mantel, so as to precipitate silver chloride. Then, the waste fluid was poured onto filter paper having a diameter of about 20 mm and containing about 0.02 mg of ash, the filter paper was placed on a Büchner funnel having a diameter of about 22 cm, and a filtration time was measured while maintaining a degree of vacuum of about 80 mmHg by using an aspirator.

TABLE 3

| Experiment No. | 35 wt % hydrochloric acid (g) | Molar ratio between hydrochloric acid and silver ions in waste fluid | Temperature of waste fluid (° C.) | Filtration time (minute) |
|---|---|---|---|---|
| Example 3-1 | 2.90 | 2.0 | 25 | 15 |
| Example 3-2 | 2.90 | 2.0 | 40 | 10 |
| Example 3-3 | 2.90 | 2.0 | 55 | 8 |
| Example 3-4 | 2.90 | 2.0 | 70 | 7.9 |
| Example 3-5 | 2.90 | 2.0 | 80 | 7.8 |

Referring to Table 3, the filtration time becomes shorter as the temperature increases. The filtration time may be excessively long at a temperature of less than about 25° C., and energy efficiency may be decreased. At a temperature of more than about 80° C., the filtration time may not be further shortened.

Example 4

Example 4 was performed in the same manner as Example 3, except that sodium chloride powder (reagent grade: more than about 99.0%) was added instead of 35 wt % hydrochloric acid.

TABLE 4

| Experiment No. | Concentration of sodium chloride (wt %) | Molar ratio between sodium chloride and silver ions in waste fluid | Temperature of waste fluid (° C.) | Filtration time (minute) |
| --- | --- | --- | --- | --- |
| Example 4-1 | 10 | 2.0 | 25 | 7 |
| Example 4-2 | 15 | 2.0 | 25 | 8 |
| Example 4-3 | 20 | 2.0 | 25 | 9 |
| Example 4-4 | 25 | 2.0 | 25 | 15 |
| Example 4-5 | 30 | 2.0 | 25 | 16 |

Referring to Table 4, the filtration time becomes longer as the concentration of the sodium chloride increases.

Example 5

About 2000 g of the waste fluid of Example 1a was moved to a rotary vacuum evaporator. Then, the waste fluid was vacuum-distilled until the volume of the filtrate became about 65% of its original volume, while rotating a flask of the vacuum evaporator at a rate of about 60 rpm at a temperature of about 100° C. and under a condition of reduced pressure of about 130 mmHg, so as to obtain about 1200 g of an acidic aqueous solution containing about 85 parts by weight of phosphoric acid and about 0.18 parts by weight of silver ions by removing volatile impurities and cooling the filtrate.

About 1000 g of the acidic aqueous solution was put into a 2 L three-necked flask equipped with a mechanical agitator, a thermometer and a reflux condenser, and hydrochloric acid having a concentration of about 35% (weight percent) was added to the acidic aqueous solution, while agitating the acidic aqueous solution for about 60 minutes and maintaining the temperature shown in Table 5, so as to precipitate silver chloride. Then, the acidic aqueous solution was poured onto filter paper having a diameter of about 20 mm and containing about 0.02 mg of ash, the filter paper was placed on a Büchner funnel having a diameter of about 22 cm, and a filtration time was measured while maintaining a degree of vacuum of about 80 mmHg by using an aspirator. A result of the measurement is shown in Table 5.

TABLE 5

| Experiment No. | 35 wt % hydrochloric acid (g) | Molar ratio between hydrochloric acid and silver ions in acidic aqueous solution | Temperature of acidic aqueous solution (° C.) | Filtration time (minute) |
| --- | --- | --- | --- | --- |
| Example 5-1 | 3.48 | 2.0 | 25 | 17 |
| Example 5-2 | 3.48 | 2.0 | 40 | 15 |
| Example 5-3 | 3.48 | 2.0 | 55 | 12 |
| Example 5-4 | 3.48 | 2.0 | 70 | 11.9 |
| Example 5-5 | 3.48 | 2.0 | 80 | 11.8 |

Referring to Table 5, the filtration time becomes shorter as the temperature increases. The filtration time may be excessively long at a temperature of less than about 25° C., and energy efficiency may be decreased. At a temperature of more than about 80° C., the filtration time may not be further shortened.

Example 6

About 1000 g of a waste fluid containing about 63 parts by weight of phosphoric acid, about 9 parts by weight of nitric acid, about 5 parts by weight of acetic acid and about 0.13 parts by weight of silver collected during a manufacturing process of a display device was put into a 2 L three-necked flask equipped with a mechanical agitator and a thermometer, and about 2.5 g of 35 wt % hydrochloric acid was added to the waste fluid, while agitating the waste fluid for about 60 minutes at a room temperature, so as to precipitate silver chloride.

Thereafter, the waste fluid was poured onto filter paper having a diameter of about 20 mm and containing about 0.02 mg of ash, the filter paper was placed on a Büchner funnel having a diameter of about 22 cm, and a precipitate and a filtrate were solid-liquid separated through vacuum suction filtration using an aspirator so as to obtain about 0.53 g of 99 wt % silver chloride.

Thereafter, the filtrate was moved to a rotary vacuum evaporator. Then, the filtrate was vacuum-distilled until the volume of the filtrate became about 65% of its original volume, while rotating a flask of the vacuum evaporator at a rate of about 60 rpm at a temperature of about 100° C. and under a condition of reduced pressure of about 130 mmHg, so as to collect about 592 g of 85 wt % phosphoric acid by removing volatile impurities and cooling the filtrate.

Example 7

About 1,000 g of the waste fluid of Example 6 was moved to a rotary vacuum evaporator. Then, the waste fluid was vacuum-distilled until the volume of the filtrate became about 65% of its original volume, while rotating a flask of the vacuum evaporator at a rate of about 60 rpm at a temperature of about 90° C. to about 110° C. and under a condition of reduced pressure of about 60 mmHg to about 200 mmHg, so as to remove volatile impurities, and then, the filtrate was cooled.

The entirety of the acidic aqueous solution was put into a 2 L three-necked flask equipped with a mechanical agitator and a thermometer, and about 2.5 g of 35 wt % hydrochloric acid was added to the acidic aqueous solution, while agitating the acidic aqueous solution for about 60 minutes at a room temperature, so as to precipitate silver chloride. Then, the acidic aqueous solution was poured onto filter paper having a diameter of about 20 mm and containing about 0.02 mg of ash, the filter paper was placed on a Büchner funnel having a diameter of about 22 cm, and the acidic aqueous solution was filtered while maintaining a degree of vacuum of about 80 mmHg by using an aspirator.

In Example 7, both about 0.54 g of 99 wt % silver chloride and about 590 g of 85% phosphoric acid were obtained.

By way of summation and review, phosphoric acid contained in waste fluids generated during manufacture of display devices may be refined and recycled without collecting silver components from the waste fluids. Phosphoric acid components may be neutralized by an alkaline neutralizing agent, and may be buried as solid waste, and liquid-phase waste may be discharged after undergoing a waste water treatment. A neutralization precipitation method may also be used to treat such waste fluids. A large amount of an alkaline neutralizing agent may be used to neutralize the waste fluids which may be highly acidic, and a large amount of sludge may be generated after the waste fluids are treated. Burial of the sludge that contains heavy metals may not be allowed, and the sludge that contains heavy metals may be separately incinerated. High-priced organic metals and acids may disposed of, the cost of treating waste fluids may be high, and it may be difficult to recycle resources.

The present disclosure provides methods for collecting silver ions and phosphoric acid contained in a waste fluid generated during a manufacturing process of a display device, and silver and phosphoric acid contained in the waste fluid may be recycled. According to the methods of the present disclosure, silver ions and phosphoric acid in a waste fluid may be efficiently collected through a simple process.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for collecting silver ions and phosphoric acid in a waste fluid, the method comprising:
    collecting silver chloride from the waste fluid by adding a chloride compound to the waste fluid; and
    collecting phosphoric acid by distilling the waste fluid from which the silver chloride has been collected.

2. The method as claimed in claim 1, wherein the chloride compound includes at least one of HCl, NaCl, $CaCl_2$, or KCl.

3. The method as claimed in claim 1, wherein collecting silver chloride from the waste fluid includes:
    generating a mixed waste fluid by adding the chloride compound to the waste fluid; and
    separating the silver chloride by filtering the mixed waste fluid.

4. The method as claimed in claim 3, wherein separating the silver chloride is performed by using at least one of vacuum filtration, pressure filtration, or gravity filtration.

5. The method as claimed in claim 3, wherein generating the mixed waste fluid is performed at a temperature of about 25° C. to about 80° C.

6. The method as claimed in claim 3, wherein generating the mixed waste fluid is performed for about 10 minutes to about 120 minutes.

7. The method as claimed in claim 1, wherein:
    the waste fluid includes silver ions, and
    a molar ratio between the chloride compound and the silver ions is about 1:2 to about 1:3.

8. The method as claimed in claim 1, further comprising obtaining silver metal from the collected silver chloride.

9. The method as claimed in claim 8, wherein obtaining silver metal is performed by using at least one of electrolysis, pyrolysis, or chemical treatment.

10. The method as claimed in claim 1, wherein the chloride compound is an aqueous solution or a solid powder.

11. The method as claimed in claim 1, wherein collecting phosphoric acid is performed at a temperature of about 80° C. to about 150° C.

12. The method as claimed in claim 1, wherein collecting phosphoric acid is performed under a pressure of about 1 mmHg to about 760 mmHg.

13. A method for collecting silver ions and phosphoric acid in a waste fluid, the method comprising:
    generating an acidic aqueous solution by distilling the waste fluid to remove volatile impurities from the waste fluid;
    adding a chloride compound to the acidic aqueous solution; and
    collecting silver chloride and phosphoric acid from the acidic aqueous solution to which the chloride compound has been added.

14. The method as claimed in claim 13, wherein collecting silver chloride and phosphoric acid includes:
    collecting precipitated silver chloride by filtering the acidic aqueous solution to provide a filtered acidic aqueous solution; and
    collecting the phosphoric acid from the filtered acidic aqueous solution.

15. The method as claimed in claim 13, wherein generating the acidic aqueous solution is performed at a temperature of about 80° C. to about 150° C.

16. The method as claimed in claim 13, wherein generating the acidic aqueous solution is performed under a pressure of about 1 mmHg to about 760 mmHg.

17. The method as claimed in claim 13, wherein the chloride compound includes one or more of HCl, NaCl, $CaCl_2$, or KCl.

18. The method as claimed in claim 13, wherein the chloride compound is an aqueous solution or a solid powder.

19. The method as claimed in claim 13, wherein collecting silver chloride and phosphoric acid is performed at a temperature of about 25° C. to about 80° C.

20. The method as claimed in claim 13, wherein collecting silver chloride and phosphoric acid is performed for about 10 minutes to about 120 minutes.

* * * * *